though united states patent office 3,285,999
Patented Nov. 15, 1966

3,285,999
THIOAMIDOPHOSPHOLANES
Bernard Buchner, Westfield, and George G. Curtis, Elizabeth, N.J., assignors, by mesne assignments, to Continental Oil Company, a corporation of Delaware
No Drawing. Filed June 7, 1963, Ser. No. 286,159
7 Claims. (Cl. 260—936)

This invention relates to monosubstituted 2-thiono-, 1,2,3 - thioamidophospholanes and 2-oxo-, 1,2,3 - thioamidophospholanes. They are formed by reacting one mol of a monosubstituted phosphorodichloridothionate or dichlorophosphate with at least one mol of a beta-mercaptoalkylamine.

The general formula of the 2-substituted, 1,3,2-thioamidophospholanes is

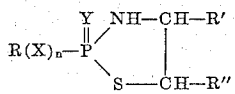

wherein X and Y is a member of the class consisting of oxygen and sulfur, $n$ is a digit selected from the group consisting of zero and one, R' and R'' is a member of the class of H and $CH_3$, R is a hydrocarbyl radical which is a member of the class of alkyl, aryl, aralkyl, alkaryl and cyclic radicals. The hydrocarbyl radicals may be substituted with an alkoxy group, or may be halogen substituted or nitro substituted. If Y is sulfur, the resulting products are 2-thiono-, 1,3,2-thioamidophospholanes. If Y is oxygen, the resulting products are 2-oxo-, 1,3,2-thioamidophospholanes.

The following is an illustrative list of phosphorodichloridothionates and phosphonodichloridothionates suitable as reactants:

O-methyl phosphorodichloridothionate
O-ethyl phosphorodichloridothionate
O-propyl phosphorodichloridothionate
O-i-propyl phosphorodichloridothionate
O-butyl phosphorodichloridothionate
O-amyl phosphorodichloridothionate
O-allyl phosphorodichloridothionate
O-decyl phosphorodichloridothionate
O-cetyl phosphorodichloridothionate
O-(2-methoxyethyl) phosphorodichloridothionate
O-phenyl phosphorodichloridothionate
O-(2-chloroethyl) phosphorodichloridothionate
O-(4-nitrophenyl) phosphorodichloridothionate
O-(2-naphthyl) phosphorodichloridothionate
O-(4-chlorophenyl) phosphorodichloridothionate
O-(2,4,6-trichlorophenyl) phosphorodichloridothionate
O-(4-nitro-2-chlorophenyl) phosphorodichloridothionate
O-(2,4-dichlorophenyl) phosphorodichloridothionate
S-ethyl phosphorodichloridothionate
Phenyl phosphonodichloridothionate
Ethyl phosphonodichloridothionate
Propyl phosphonodichloridothionate
Butyl phosphonodichloridothionate When using the respective dichlorophosphate instead of the dichloridothionate, the respective 2-oxo-, 1,3,2-thioamidophospholane is formed. To avoid unnecessary repetition the illustration of the invention below will be made on phosphorodichloridothionates. The same information relates to the respective oxo-compounds also, except where specified. Instead of the phosphorodichloridothionates phosphorodibromidothionates may be used as starting materials and instead of the dichlorophosphates the dibromophosphates may be used also.

The molecular proportion of the beta-mercaptoalkylamine to the monosubstituted phosphorodichloridothionate is at least one of the former to one of the latter reactant. Increasing the former to two mols, does not disturb the formation of the thioamidophospholanes in predominant quantities.

The reaction is carried out preferably in the presence of an acid acceptor and an inert solvent.

Suitable acid acceptors are, e.g.: triethylamine, pyridine, N-ethylmorpholine. A proper excess of the mercaptoalkylamine may also be used as an acid acceptor.

Benzene, toluene, chloroform, tetrahydrofuran, ethylene chloride illustrate some of the suitable inert solvents. The boiling point of these solvents range from about 61° C. to about 111° C. However, solvents with higher boiling points or somewhat lower boiling points are also suitable. As it will be illustrated, the reaction can also be carried out in aqueous medium, where water replaces the inert solvent.

Suitable mercaptoalkylamines are illustrated by the following list:

Beta - mercaptoethylamine ($HS-CH_2-CH_2-NH_2$) (2-mercaptoethylamine),
Beta-mercaptopropylamine

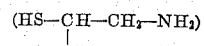

(2-mercapto-2-methylethylamine),
2-mercapto-, 1-methylethylamine

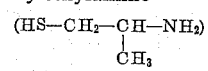

The last two mentioned mercaptoalkylamines are isomers and are frequently present in admixture in technical grades of beta-mercaptopropylamine.

With regard to temperatures, the examples will illustrate the reaction conditions. The temperature of the mercaptoalkylamine solution, at the point of addition, is preferably such at which the mercaptoalkylamine stays at least partially in solution. In the case of beta-mercaptoethylamine, when using benzene or toluene as solvent, about 40° C. is the minimum temperature, as below this temperature the beta-mercaptoethylamine starts to come out of solution. For the mercaptoethylamine containing solution a minimum temperature of 10° C. may be mentioned. The reaction itself does not require refluxing. It is preferred to carry it out below 70° C. Generally speaking somewhat lower temperatures give higher yields. The following examples illustrate this invention, without limiting its scope.

*Example A.—Preparation of beta-mercaptoethylamine*

Four liters of ethanol were cooled to −70° C. to −80° C. and 850 grams (25.0 mols) of hydrogen sulfide gas was introduced into the cooled ethanol, while stirring. After the gas addition was completed the temperature was raised to −40° C. At this stage 258.0 grams of ethylenimine (6.0 mols), dissolved in one liter of ethanol, was added dropwise under agitation to the hydrogen sulfide solution in ethanol. After the addition was completed, the reaction mixture was stirred for two hours at −30° C. Then the temperature was slowly raised to room temperature, while the excess hydrogen sulfide escaped. Most of the ethanol was removed at 25–30° C. under vacuum. The precipitated beta-mercaptoethylamine was filtered, dried in a vacuum desiccator and stored until used.

*Example 1.—2-(O-ethyl), 2-thiono-, 1,3,2-thioamidophospholane)*

To a solution of 98. 5 grams (0.5 mol) of O-ethyl phosphorodichloridothionate in 300 ml. of benzene kept at 40° C. and under stirring, was added slowly a solution of 40.7 grams (0.53 mol) of beta-mercaptoethylamine and 202.4 grams (2.0 mols) of triethylamine in 1200 ml. of benzene. After the addition the reaction mixture was stirred for four hours at 65° C. under nitrogen atmosphere, whereupon the mixture was cooled to room temperature and filtered under suction. The filtrate was concentrated under vacuum to a volume of 800 ml.; the concentrate was washed twice with 400 ml. portions of distilled water and the organic layer dried over anhydrous magnesium sulfate. After the drying agent was filtered off, the remaining solvent was removed under vacuum and the crude residue distilled in a molecular still under high vacuum. The product 2-(O-ethyl), 2-thiono-, 1,3,2,-thioamidophospholane.

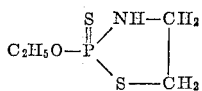

was recovered. The density ($d_4^{20}$) was 1.302 and, the refractive index ($N_D^{20}$), 1.5874.

*Example 2.—2-ethyl, 2-thiono, 1,3,2-thioamidophospoholane*

To a solution of 40.7 grams (0.25 mol) of ethyl phosphonodichloroidothionate in 400 ml. of benzene cooled to 10° C. and under stirring a warm solution (40° C.–60° C.) of 20.8 grams (0.27 mol) of beta-mercaptoethylamine and 76.0 grams (0.75 mol) of triethylamine in 800 ml. of benzene was added slowly. After the addition the reaction mixture was stirred for four hours at 50° C. under nitrogen atmosphere, thereupon the reaction mixture was processed as described in Example 1. The product 2-ethyl-, 2-thiono-, 1,3,2-thioamidophospholane,

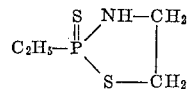

was recovered. The density ($d_4^{20}$) was 1.268 and, the refractive index ($N_D^{20}$), 1.6165.

*Example 3.—2-butyl, 2-thiono-, 1,3,2-thioamidophospholane*

To a solution of 38.2 grams (0.2 mol) of butyl phosphonodichloridothionate in 1 liter of toluene, cooled to −20° C. and under stirring, a warm (40°–60° C.) solution of 31.1 grams (0.4 mol) of beta-mercaptoethylamine and 41.5 grams (0.41 mol) of triethylamine in 1.7 liters of toluene was added slowly. After the addition was completed at −20° C. the reaction mixture was stirred for three hours at 40° C. under nitrogen atmosphere, thereupon the reaction mixture was processed as described in Example No. 1. There was recovered as produce 2-butyl-, 2-thiono, 1,3,2-thioamidophospholane having the following structural formula:

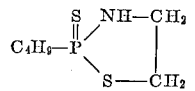

Certain physical properties of this compound were determined. The density ($d_4^{20}$) was 1.182 and the refractive index ($N_D^{20}$) was 1.5915.

*Example 4.—2-phenyl, 2-thiono-, 1,3,2-thioamidophospholane*

To a solution of 105.5 grams (0.5 mol) of phenyl phosphonodichloridothionate in 1 liter of toluene, cooled to −5° C. and under stirring, a warm (40°–60° C.) solution of 84.7 grams (1.1 mols) of beta-mercaptoethylamine and 111.4 grams (1.1 mols) of triethylamine in 2.5 liters of toulene was added slowly. After the addition was completed at −5° C., the reaction mixture was stirred for two hours at 45° C. under nitrogen atmosphere; thereupon the reaction mixture was processed as described in Example 1. The product 2-phenyl-, 2-thiono-, 1,3,2-thioamidophospholane:

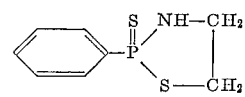

was recovered. The density ($d_4^{20}$) was 1.321 and, the refractive index ($N_D^{20}$), 1.6807.

*Example 5.—2-(O-propyl), 2-thiono, 1,3,2-thioamidophospholane*

To a solution of 96.0 grams (0.5 mol) of O-propyl phosphorodichloridothionate in 1 liter of toluene, cooled to −5° and under stirring, a warm (40°–60° C.) solution of 84.7 grams (1.1 mols) of beta-mercaptoethylamine and 111.4 grams (1.1 mols) of triethylamine in 2.5 liters of toluene were added slowly. After the addition was completed at −5° C. the reaction mixture was stirred for two hours at 45° C. under nitrogen atmosphere. Thereupon the reaction mixture was processed as described in Example 1. There was recovered as product 2-(O-propyl), 2-thiono-, 1,3,2-thioamidophospholane having the following structural formula:

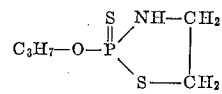

Certain physical properties of this compound were determined. The density ($d_4^{20}$) was 1.249 and, the refractive index ($N_D^{20}$) was 1.5707.

*Example 6.—2-(O-phenyl), 2-thiono, 1,3,2-thioamidophospholane*

To a solution of 113.5 grams (0.5 mol) of O-phenyl phosphorodichloroidothionate in 1 liter of toluene cooled to −5° C. and under stirring a warm (40°–60° C.) solution of 84.7 grams (1.1 mols) of beta-mercaptoethylamine and 111.4 grams (1.1 mols) of triethylamine in 2.5 liters of toluene was added slowly. After the addition was completed the reaction mixture was stirred for two hours at 45° C. under nitrogen atmosphere, thereupon the reaction mixture was processed as described in Example 1. The product 2-(O-phenyl), 2-thiono-, 1,3,2-thioamidophospholane:

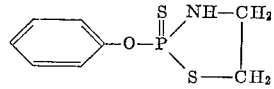

was recovered. The density ($d_4^{20}$) was 1.346 and, the refractive index ($N_D^{20}$), 1.6800.

*Example 7.—2-(O-butyl), 2-thiono-, 1,3,2-thioamidophospholane*

To a solution of 103.5 grams (0.5 mols) of O-butyl phosphorodichloridothionate in 1 liter of toluene, cooled to −5° C. and under stirring, a warm (40°–60° C.) solution of 84.7 grams (1.1 mols) of beta-mercaptoethylamine and 111.4 grams (1.1 mols) of triethylamine in 2.5 liters of toluene was added slowly. After the addition was completed the reaction mixture was stirred for two hours at 50° C. under nitrogen atmosphere, thereupon the reaction mixture was processed as described in Example 1. The product 2-(O-butyl), 2-thiono-, 1,3,2-thioamidophospholane:

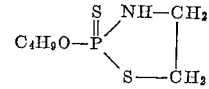

was recovered in 72.0% yield. The density ($d_4^{20}$) was 1.165 and, the refractive index ($N_D^{20}$), 1.5611.

*Example 8.—2-(O-methyl), 2-thiono-, 1,3,2-thioamidophospholane*

To a solution of 82.5 grams (0.5 mol) of O-methyl phosphorodichloridothionate in 1 liter of toluene, cooled to −5° C. and under stirring, a warm (40°–60° C.) solution of 46.2 grams (0.6 mol) of beta-mercaptoethylamine and 111.4 grams (1.1 mols) of triethylamine in 2.5 liters of toluene was added slowly. After the addition was completed the reaction mixture was stirred for two hours at 50° C. under nitrogen atmosphere, thereupon the reaction mixture was processed as described in Example 1. The product 2-(O-methyl), 2-thiono-, 1,3,2-thioamidophospholane:

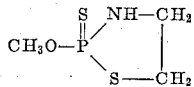

was recovered. The density ($d_4^{20}$) was 1.363 and, the refractive index ($N_D^{20}$), 1.6000.

*Example 9.—2-(O-2'-chloroethyl), 2-thiono-, 1,3,2-thioamidophospholane*

To a solution of 106.7 grams (0.5 mol) O-2-chloroethyl phosphorodichloridothionate in 1 liter of toluene, cooled to −5° C. and under stirring, a warm (40°–60° C.) solution of 46.2 grams (0.6 mol) of beta-mercaptoethylamine and 111.4 grams (1.1 mols) of triethylamine in 2.5 liters of toluene was added slowly. After the addition was completed the reaction mixture was stirred for two hours at 50° C. under nitrogen atmosphere, thereupon the reaction mixture was processed as described in Example 1. The product 2-(O-2'-chloroethyl), 2-thiono-, 1,3,2-thioamidophospholane:

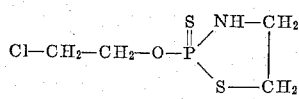

was recovered in 65.5% yield. The density ($d_4^{20}$) was 1.441 and, the refractive index ($N_D^{20}$), 1.6074.

*Example 10.—2-(O-2-naphthyl), 2-thiono-, 1,3,2-thioamidophospholane*

To a solution of 139.0 grams (0.5 mol) of O-naphthyl phosphorodichloridothionate in 1 liter of toluene, cooled to −5° C. and under stirring, a warm (40°–60° C.) solution of 84.7 grams (1.1 mols) of beta-mercaptoethylamine and 111.4 grams (1.1 mols) of triethylamine in 2.5 liters of toluene was added slowly. After the addition was completed at −5° C. the reaction mixture was stirred for two hours at 60° C. under nitrogen atmosphere; thereupon the reaction mixture was filtered while hot. The solvent was removed under vacuum and the crude recrystallized thrice from carbon-tetrachloride. The product 2-(O-2-naphthyl), 2-thiono-, 1,3,2-thioamidophospholane:

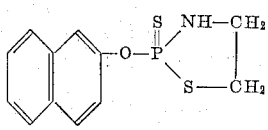

was recovered in 63.0% yield. The melting point was 100° C.–101° C.

*Example 11.—2-(O-ethyl), 2-oxo, 1,3,2-thioamidophospholane*

To a solution of 65.2 grams (0.4 mol) of O-ethyl dichlorophosphate in 2.5 liters of toluene, cooled to −65° C. and under stirring, a solution of 38.5 grams (0.5 mol) of betamercaptoethylamine and 101.2 grams (1.0 mol) of triethylamine in 1.5 liters of toluene was added slowly. After the addition the reaction mixture was heated to 55° C. for two hours under nitrogen atmosphere; whereupon the contents were cooled to room temperature and filtered under suction. The solvent was removed under vacuum and the crude residue distilled in a molecular still under high vacuum. The product 2-(O-ethyl), 2-oxo, 1,3,2-thioamidophospholane:

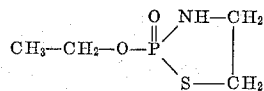

was recovered in 59.8% yield. The density ($d_4^{20}$) was 1.306 and, the refractive index ($N_D^{20}$), 1.5278. The product of this example is water soluble.

Example 12 illustrates 5 different sets of variations on preparing the product of Example 1.

*Example 12.—2-(O-ethyl), 2-thiono-, 1,3,2-thioamidophospholane*

(a) To a solution of 88.8 grams (1.14 mols) of beta-mercaptoethylamine and 142.5 grams (1.14 mols) of sodium carbonate monohydrate in 800 ml. of water, cooled to 20° C. and under stirring, was added 89.5 grams (0.5 mol) of O-ethyl phosphorodichloridothionate in 400 ml. of dioxane. After the addition was completed the reaction mixture was stirred for two hours at room temperature, thereupon 1.5 liters of water were added. The organic layer separated and the water layer was extracted with 200 ml. of ethyl ether. The extract and the separated layer were combined, dried over anhydrous magnesium sulfate, filtered, and the solvent removed under vacuum. The crude product was purified by high-vacuum distillation in a molecular still, yielding the product: 2-(O-ethyl), 2-thiono, 1,3,2-thioamidophospholane.

(b) The reaction described under (a) above was repeated with a change of using acetone instead of dioxane as solvent. The product was identical with that obtained under (a).

(c) To a suspension of 88.8 grams (1.14 mols) of beta-mercaptoethylamine in 3 liters of benzene, cooled to 10° C. and under stirring, was added slowly a solution of 89.5 grams (0.5 mol) of O-ethyl phosphorodichloridothionate and 101.0 grams (1.0 mol) of triethylamine in 1 liter of benzene. After the addition was completed the reaction mixture was stirred for three hours at 40° C. under nitrogen atmosphere, thereupon the reaction mixture was processed as described in Example 1.

(d) The reaction of Example 1 was repeated with the difference that the temperature during the addition of the solution containing the beta-mercaptoethylamine to the solution containing the O-ethyl phosphorodichloridothionate was kept at 10° C. After the addition was completed the reaction mixture was stirred for three hours at 40° C. The resulting product was the same as obtained under Example 1.

(e) To a solution of 44.8 grams (0.25 mol) of O-ethyl phosphorodichloridothionate in 1 liter of toluene, cooled to −35° C. and under stirring, was added slowly a warm (40°–60° C.) solution of 40.5 grams (0.52 mol) of beta-mercaptoethylamine and 52.6 grams (0.52 mol) of triethylamine in 2 liters of toluene. After the addition was completed the reaction mixture was stirred for three hours at 30° C. thereupon, the reaction mixture was processed as described in Example 1.

The five variations of Example 12, together with Example 1, as sixth variation, illustrate, that the products of this invention can be made under diversified conditions. In Examples 12(a), 12(b) and 12(c) the phosphorodichloridothionate was added to a solution containing the beta-mercaptoethylamine and acid acceptor. In Examples 1, 12(d) and 12(e) the order of addition was reversed and the beta-mercaptoethylamine and acid acceptor were added to the phosphorodichloridothionate. In Examples 1, 12(c), 12(d) and 12(e) an aromatic inert solvent was used with the triethylamine as acid acceptor. Whereas, in Examples 12(a) and 12(b) the beta-mercaptoethylamine and sodium carbonate as acid acceptor were dissolved in water and the phosphorodichloridothionate was dissolved in a water miscible organic solvent. The molecular proportion of the reactants was about 1:1 in Example 1 and 12(d), whereas in the other 4 examples 2 mols of beta-mercaptoethylamine were used per mol of phosphorodichloridothionate. The initial reaction temperature varied also greatly and represented the following range: 40° C. for Example 1; 20° C. for Examples 12(a) and 12(b); 10° C. for Examples 12(c) and 12(d) and —35° C. for Example 12(e). In all cases the same end product was obtained, having the same physical constants.

The products of this invention have pronounced antioxidant activity on natural and synthetic rubbers and other polymers, which are affected by oxygen in the presence or absence of heat and light. The structural position of sulfur and nitrogen in their molecule is believed to be the reason for this activity. They act simultaneously as stabilizers. Many of the compounds have insecticidal activity. Some have herbicidal properties. Many of the oxo-compounds, like the product of Example 11, are water soluble and where this property has importance in their application, have unique advantages. For all other uses, where the water solubility is of no importance, the 2-thiono-, 1,3,2-thio amido phospholanes are preferred.

Insecticidal properties were tested with the compounds of Examples 1, 2 and 3. Example 1 yields identical product with Examples 12(a), (b), (c), and (d) and (e).

The product of Example 1, [2-(O-ethyl), 2-thiono-, 1,3,2-thioamidophospholane], was active against confused flour bettle (*Tribolium confusum*) and drosophila fly (*Drosophila melanogaster*). The original screening for action on confused flour bettle was carried out by a contact residual film test. In the procedure the master dispersion of the chemical is prepared in the form of acetone solution, or as wettable powder, if the material is acetone insoluble. In the next step 1 ml. of the chemical dosage to be tested is deposited uniformly over a 9.6 cm. diameter Petri plate. Uniformity is achieved by known methods, like swirling motion, etc. The chemical deposit is then permitted to dry to a film-like layer. Adult confused flour bettles, priorly starved for 24 hours, are then placed ten per plate on duplicate test vessels. The Petri plates are closed during the duration of the observation. The insects are examined frequently over the first few hours, to observe the effect of the chemicals and "knockdown" and rapidity of action are noted. Mortality rates are also noted. The product of Example 1 caused 100% kill in a 5 day period and 10% kill during the first two days. 90% of the insects were affected after 48 hours. The control check showed all insects unaffected and alive during the entire five day period. Dosage was 5000 p.p.m.

The original screening for action on drosophila melanogaster was also carried out by a contact residual film test. The test chemical is deposited within test tubes (25 mm. x 200 mm.) in a volatile solvent. The test tubes are mechanically roated to obtain a thin film uniformly distributed on the inside walls. The flies are released into each tube and the test tubes are stoppered with an absorbent cotton plug holding a protruding tip (Dental Gum) impregnated with sufficient liquid food to carry them for 3 days. At 1000 p.p.m. dosage of the product of Example 1, the mortality rate was 100% within two hours. The control check showed no mortality at 6 hours time interval and 4% after 12 hours.

Similar activity was found on pomace fly (*Drosophila melanogaster*) with the products of Example 2, [2-ethyl, 2-thiono, 1,3,2-thioamidophospholane], and Example 3, [2-butyl-, 2-thiono-, 1,3,2-thioamidophospholane]. In order to establish comparative activity, dose mortality studies were made with the same method with the products of Examples 1, 2 and 3. The product of Example 1, showed at 100, 50, 10, 5 and 2½ p.p.m. 100% kill. At 0.63 p.p.m. the kill was 47%. The product of Example 2, showed at concentrations ranging from 500 to 16 p.p.m. 100% kill and at 6.2 p.p.m. dosage 66% kill. The product of Example 3, showed at 1000 and 500 p.p.m. dosage 100% kill, at 250 p.p.m. 97% kill, at 125 p.p.m. 92% kill and at 31 p.p.m. dosage 53% kill. All tests were for a duration of three days. The detailed results were plotted on log-probability paper for the purposes of obtaining dose-mortality curves. The $LD_{95}$ values were in average for the product of Example 1: 1.5 p.p.m., for the product of Example 2: 17 p.p.m. and for the product of Example 3: 150 p.p.m. This comparative behavior does not indicate performance when tested on other insects.

In combined chemosterilant-insecticidal screening tests, the product of Example 1 was tested on screw-worm fly, house fly and Mexican fruit fly. In the screw-worm fly test topical and oral application is used on adults less than 24 hours old. Topical application is made with a micrometer-controlled calibrated syringe. Two microliters of a 10% acetone solution of the candidate chemical are applied to the body of each anesthetized insect. Other flies are fed a freshly prepared quantity of sugar syrup containing 1% of the candidate chemical daily for 5 days. On the eighth day following topical and oral treatments, females are given opportunity to lay eggs which are subsequently observed for hatching. It was observed, that dosages above 0.1% in topical application and above 0.005% in oral application, were lethal, when using the product of Example 1. Distinct insecticidal activity was indicated. In the house fly test granulated sugar and/or regular fly food (consisting of six parts of sugar, six parts of non-fat dry milk and one part of powdered dry egg) containing 1% of the candidate chemical is prepared by treating it with a solution or suspension of the chemical in a volatile solvent and allowing the solvent to evaporate. The sugar or fly food is repulverized and placed in emergence cages containing 100 newly emerged adult flies. Cages containing untreated food are used as checks. After 3 days untreated food is supplied to the cages of flies. 5 to 7 days later oviposition medium is supplied and results observed. The product of Example 1, showed at 1% test concentration both with sugar and with fly food 100% mortality of the flies. The control cages showed with both foods normal life and percent egg hatch. In the test with Mexican fruit fly the flies are maintained in 8 x 8 x 8 inch cages at about 25° C. in a room ventilated by an exhaust fan, but not controlled for humidity. The carrier food consists of 4 parts of granulated sugar and 1 part of orange juice crystals neutralized with NaOH prior to addition of the test material. Acetone was used as solvent for the test chemicals. Feeding began with fly emergence and was continued for a 20 day period. Flies were egged at 13 and 20 days of age and mortality recorded at weekly intervals. The compound is evaluated on the basis of total mortality, egg production and hatch responses. Mortality data were as follows:

| Dose, percent | Percent mortality | |
|---|---|---|
| | Males | Females |
| 0.1 | 16.7 | 20.5 |
| 0.5 | 83.3 | 59.0 |
| 1.0 | 100.0 | 100.0 |
| 2.0 | 100.0 | 100.0 |

The mortality percentage was corrected with Abbott's formula. At 0.1% and 0.5% dosage the egg production was normal and percentage of hatch was normal. The results indicate insecticidal activity for the product of Example 1, for Mexican fruit fly without useful chemosterilant activity. (A good chemosterilant should not cause mortality and reduce radically egg production and hatch.)

With the product of Example 1 other insecticidal tests were also carried out. In one set topical application on house flies was tested. One microliter of a 1.0%, 0.1% and 0.01% solution of the chemical in acetone was applied to the dorsum of 3 day old adult female flies. 4 sets of 25 each, total of 100 flies were involved at one particular concentration. As checks, application was made with the solvent alone and a set of untreated control was also made. At the 1% concentration set all 100 flies were killed in less than 24 hours. None were killed in the checks. At 0.1% concentration 99 were killed out of 100 in 2½ hours, all 100 were killed in 8 hours. None were killed in the checks in 24 hours. At the 0.01% concentration 7 were killed in 8 hours, 12 in 18 hours and 18 in 24 hours. None were killed in the checks. In this type of application one microliter is considered to be equal to about one half of one drop, as one drop is close to two microliters. In another set topical application to German roaches was tested. Two microliters of a 0.1% and 0.01% solution of the product of Example 1 in acetone were applied to the ventral surface of the thorax of female German roaches. Four replicates of 10 roaches were in each experiment (total of 40) and additional checks were made with solvent treatment and non-treatment. At 0.1% concentration 27 of 40 were killed in 1½ hours and 36 of 40 were killed in 24 hours. None were killed in the checks. The 0.01% concentration was below the active range of this product and none of the roaches were killed within 48 hours. In another test larvicide tests were carried out with mosquito larvae (Aedes aegyipti). Ten fourth instar larvae were placed in each of test tubes (2 replicates for each three dilutions plus one check). The dilution consisted of 1 p.p.m., 10 p.p.m. and 50 p.p.m., and a tap-water check. At 1 p.p.m. in the combined replicate tests 4 out of 20 were killed in 24 hours and 18 in 48 hours. At the 10 p.p.m. and 50 p.p.m. concentration within 2 hours all larvae were killed. No kill was observed in the check within 48 hours. In still another test topical application was applied to adult female mosquitoes (Aedes aegyipti). 0.43 microliter of acetone solution of the chemicals in three concentrations: 0.1%, 0.01% and 0.001% were applied to the dorsum of 1 day old adult female mosquitoes. Checks were made with acetone treatment alone and no treatment. Ten females were in each test. At 0.1% concentration 100% were killed in 24 hours. At 0.01% concentration 20.0% were killed in 24 hours and 30% in 48 hours. None were killed in the checks during the 48 hours' period. These tests show the general insecticidal activity of the product of Example 1.

Herbicidal screening test was carried out with the products of Examples 1, 2 and 3. Two grams of the compounds were placed into 200 ml. calibrated containers. They were dissolved by adding 15 cc. of acetone. The containers were filled to the 200 ml. mark with a 0.1% solution of Igepal CO 730, as dispersing agent, dissolved in water. Post emergent tests were tested at a rate of 19 pounds active material per acre area basis on duplicated 12" x 18" flats containing 8 varieties of young plants: radish, ryegrass, cotton, tomato, beans, oats, pigweed and crabgrass. Each flat was sprayed with 30 ml. of the 1% active solutions. Pre-emergent tests were made on 1' x 1' flats containing rows of radishes, ryegrass, corn, beans and oats, and then overseeded with "soil-weed" seed mixture. Weeds in the mixture were crabgrass, pigweed, plantain and lambsquarter. The soil also contained naturally morning glory and oxalis seeds. The flats were treated with 19 pounds active material per acre rate with the chemicals and growth and germination effects were noted periodically after treatment.

In the post-emergent tests the product of Example 1 showed only moderate activity on oats in a 14 days' period. It was inactive on other plants. The product of Example 2, [2-(ethyl), 2-thiono-, 1,3,2-thioamidophospholane], showed distinct activity, listed in decreasing order, on: pigweed (most), cotton, tomato, crabgrass, beans, radish, ryegrass and oats (least). This compound was unique in action. It reacted slowly with a metabolic type action. The action showed effects in about 7 days. Its effect is similar to "calcium deficiency" symptoms. Mostly new growth tends to be affected. Tips die soon after partial development and turn dark brown with tomatoes and to a lesser extent with beans and pigweed. Radish tips become mottled white. Oat shoots are twisted, curled, notched and striped. Crabgrass takes stubby appearance. All plants, except ryegrass are stunted to some extent. Growth inhibitor properties are indicated. The product of Example 3, had moderate activity in 14 days on cotton, radish and oats, in decreasing order, with no activity on the other plants.

In the pre-emergent tests the product of Example 3 was the most active, reducing the maximum population from 100 to about 55%, indicating useful activity. It was more active on dicots, than on monocots. The same average values were 67% for the product of Example 1 and 87% for the product of Example 2, indicating insufficient activity for practical consideration.

In a somewhat similar herbicidal screening test, as described above, the product of Example 5 [2-(O-propyl), 2-thiono, 1,3,2-thioamidophospholane], was tested. In this test in the post-emergent evaluation bush beans, radish, tomato, pigweed and crimson clover were used, as dicots, and oats, crabgrass and ryegrass as monocots. Pigweed was 27 days old on treatment day, crabgrass, radish, ryegrass and crimson clover was 23 days old and bush beans, oats and tomato transplants were 21 days old. 10% acetone solution was diluted with water to proper concentration. Application was at 19 pounds per acre level. Other conditions were as previously described. On dicots the order of activity in decreasing order was: crimson clover, radish, pigweed and bush bean (least), with no effect on tomato. On monocots the order was: crabgrass (most), ryegrass and oats (least). The highest activity was shown on crimson clover and crabgrass. In pre-emergent evaluation this compound did not show appreciable activity.

We claim:
1. A substituted 1,3,2-thioamidophospholane having the general structure

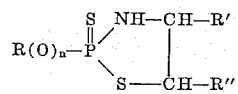

wherein $n$ is a digit selected from the group consisting of zero and one, wherein, when $n$ is zero, R is selected from the group consisting of alkyl and phenyl groups and wherein, when $n$ is one, R is selected from the group consisting of halogen-substituted alkyl, halogen-substituted phenyl and nitro-substituted phenyl groups, and wherein R' and R" are selected from the group consisting of H and $CH_3$, no more than one being $CH_3$.

2. A compound in accordance with claim 1 wherein R is 2-chloroethyl.
3. A compound in accordance with claim 1 wherein R is a halo-substituted alkyl group.
4. A compound in accordance with claim 1 wherein R is a nitro-substituted phenyl group.
5. A compound in accordance with claim 1 wherein R is a halo-substituted phenyl group.
6. 2-ethyl, 2-thiono, 1,3,2-thioamidophospholane.
7. 2-butyl-, 2-thiono-, 1,3,2-thioamidophospholane.

References Cited by the Examiner
UNITED STATES PATENTS
2,865,948  12/1958  Fusco _____ 260—461.104

CHARLES B. PARKER, Primary Examiner.

F. M. SIKORA, Assistant Examiner.